(12) United States Patent
Ebrahimi Afrouzi

(10) Patent No.: US 10,237,167 B2
(45) Date of Patent: Mar. 19, 2019

(54) INTELLIGENT ROUTING METHOD FOR ROUTING ITEMS THROUGH A NETWORK

(71) Applicant: Ali Ebrahimi Afrouzi, San Jose, CA (US)

(72) Inventor: Ali Ebrahimi Afrouzi, San Jose, CA (US)

(73) Assignee: A.I. Incorporated (CA)

( * ) Notice: Subject to any disclaimer, the term of this patent is extended or adjusted under 35 U.S.C. 154(b) by 154 days.

(21) Appl. No.: 15/006,434

(22) Filed: Jan. 26, 2016

(65) Prior Publication Data

US 2016/0234098 A1    Aug. 11, 2016

Related U.S. Application Data

(60) Provisional application No. 62/113,484, filed on Feb. 8, 2015.

(51) Int. Cl.
*H04L 12/28* (2006.01)
*H04L 12/727* (2013.01)
*H04L 12/26* (2006.01)

(52) U.S. Cl.
CPC ........ *H04L 45/121* (2013.01); *H04L 43/0858* (2013.01)

(58) Field of Classification Search
CPC ... H04L 43/0858; H04L 12/727; H04L 12/26; H04L 45/121
See application file for complete search history.

(56) References Cited

U.S. PATENT DOCUMENTS

| | | | | |
|---|---|---|---|---|
| 6,301,244 B1* | 10/2001 | Huang | ............ | H04L 45/12 370/238 |
| 6,317,686 B1* | 11/2001 | Ran | ............ | G01C 21/3691 701/117 |
| 7,701,857 B2* | 4/2010 | Hikspoors | ............ | H04L 45/10 370/238 |
| 8,385,211 B2* | 2/2013 | Scarlatti | ............ | H04L 45/123 370/238 |
| 2007/0106465 A1* | 5/2007 | Adam | ............ | G01C 21/3492 701/533 |
| 2009/0287408 A1* | 11/2009 | Gerdes | ............ | G01C 21/3423 701/533 |

(Continued)

OTHER PUBLICATIONS

Ronald Romero Reyes, "Reward-based Online Routing and Spectrum Assignment in Flex-grid Optical Networks", IEEE, published in: Telecommunications Network Strategy and Planning Symposium (Networks), 2016 17th International; Date of Conference: Sep. 26-28, 2016.*

*Primary Examiner* — Lan-Huong Truong
(74) *Attorney, Agent, or Firm* — STLG Law Firm; Soody Tronson

(57) ABSTRACT

A method for selecting routes for items being sent from a given beginning node to a given destination node within a network. Each segment of a trip is evaluated and assigned a negative reward based on the deviation from the ideal length of time to complete that segment. Upon arrival of the item at the destination node, the route is assigned a large positive reward. The system is configured to attempt to maximize rewards at all times by selecting the routes with the lowest likelihood of delay. As more and more trips are completed, the control system may define a policy that selects routes based on their probability of yielding the highest reward.

5 Claims, 2 Drawing Sheets

(56) References Cited

U.S. PATENT DOCUMENTS

| | | | |
|---|---|---|---|
| 2011/0208419 A1* | 8/2011 | Boss | G01C 21/3492 701/533 |
| 2013/0291060 A1* | 10/2013 | Moore | G06F 21/6245 726/1 |
| 2014/0025225 A1* | 1/2014 | Armitage | B60W 40/09 701/1 |
| 2014/0177476 A1* | 6/2014 | Perrett | H04L 41/12 370/255 |

* cited by examiner

INTELLIGENT ROUTING METHOD FOR ROUTING ITEMS THROUGH A NETWORK

CROSS-REFERENCE TO RELATED APPLICATIONS

This application claims the benefit of provisional patent application Ser. No. 62/113,484, filed Feb. 8, 2015 by the present inventor.

FIELD OF INVENTION

The present invention relates to methods for using artificial intelligence to route items through networks.

BACKGROUND OF INVENTION

The following is a tabulation of some prior art that presently appears relevant:

| U.S. Patent Documents | | | |
| --- | --- | --- | --- |
| Patent Number | Kind Code | Issue Date | Patentee |
| 6,411,701 | B1 | 2002 Jun. 25 | Nokia Siemens Networks GmbH and Co KG |
| 5,142,570 | A | 1992 Aug. 25 | TTI Inventions A LLC |
| 6,606,380 | B1 | 2003 Aug. 12 | Telefonaktiebolaget L M Ericsson |
| 5,590,118 | A | 1996 Dec. 31 | Alcatel-Lucent NV |
| 634122 | B1 | 2002 Jan. 29 | Telefonaktiebolaget L M Ericsson |
| 6,829,347 | B1 | 2004 Dec. 7 | RPX CLEARINGHOUSE LLC |
| 6,282,170 | B1 | 2001 Aug. 28 | RPX CLEARINGHOUSE LLC, World Trade Center Montreal |

| U.S. Patent Application Publications | | | |
| --- | --- | --- | --- |
| Publication Nr | Kind Code | Publ. Date | Applicant |
| 20090190579 | A1 | 2009 Jul. 30 | Telefonaktiebolaget L M Ericsson |

Various types of networks are used to deliver items from a starting point to an end point via links between nodes. However, currently available methods do not always select the most efficient route in real-time. Delays due to traffic in a network may cause an item to arrive later than normal at its destination. A need exists for a method to intelligently route items within a network from a starting point to a destination based on historical data of past trips within the network.

SUMMARY OF INVENTION

It is a goal of the present invention to provide a method for intelligently routing items through a network that selects the best fastest route based on historical data.

The present invention achieves the aforementioned goal through a routing method capable of intelligently selecting paths for an item to most rapidly reach its destination. According to the proposed invention, each segment of a trip is evaluated and assigned a small negative reward based the amount of delay incurred in each segment. Upon completion of a trip, a large positive reward is assigned. The system then calculates the value of each trip based on the net rewards of that trip. The control system can then use the value of each trip to define a policy to select the best route for any given future trip at a particular time. That is, the route with the highest probability of yielding the highest net reward.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Generally, the present invention relates to a method for routing items through a network of nodes connected by links using a positive and negative rewards system.

Figure 1:
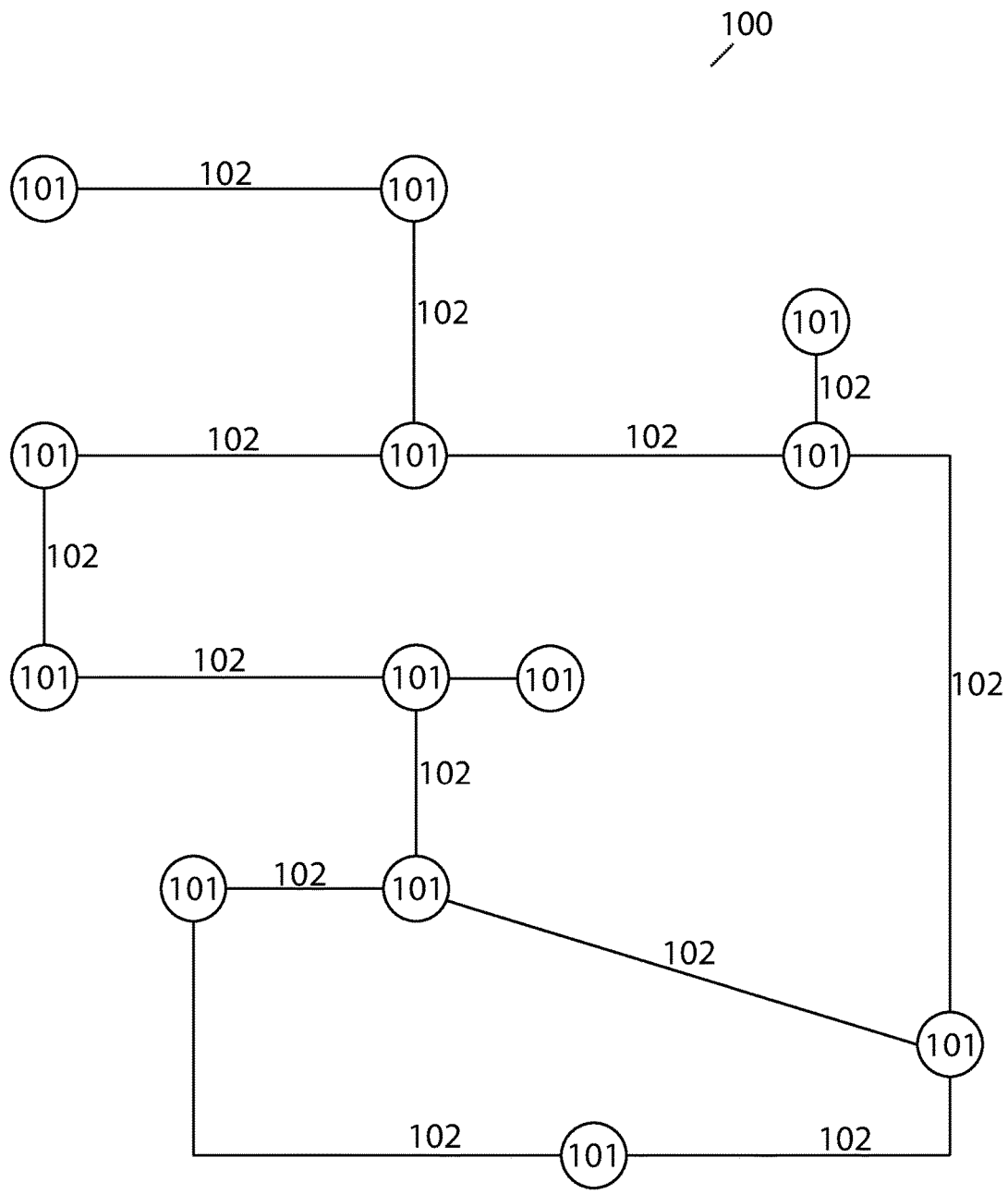
FIG. 1 illustrates a network comprised of a plurality of nodes connected by links embodying features of the present invention.

Each item's trip from a starting node to a destination node is monitored. An item may travel from a starting node along a link to another node where it is transferred to another link, by which it travels to another node where it is transferred to another link, and so on, until the item has arrived at its destination node. Referring to FIG. 1, a network 100 is illustrated. The network is comprised of nodes 101 and links 102 connecting the nodes. A plurality of possible routes between a given starting node and a given destination node may exist. The proposed method is concerned with the problem of choosing the most efficient route from a given starting node to a given destination node.

Figure 2:
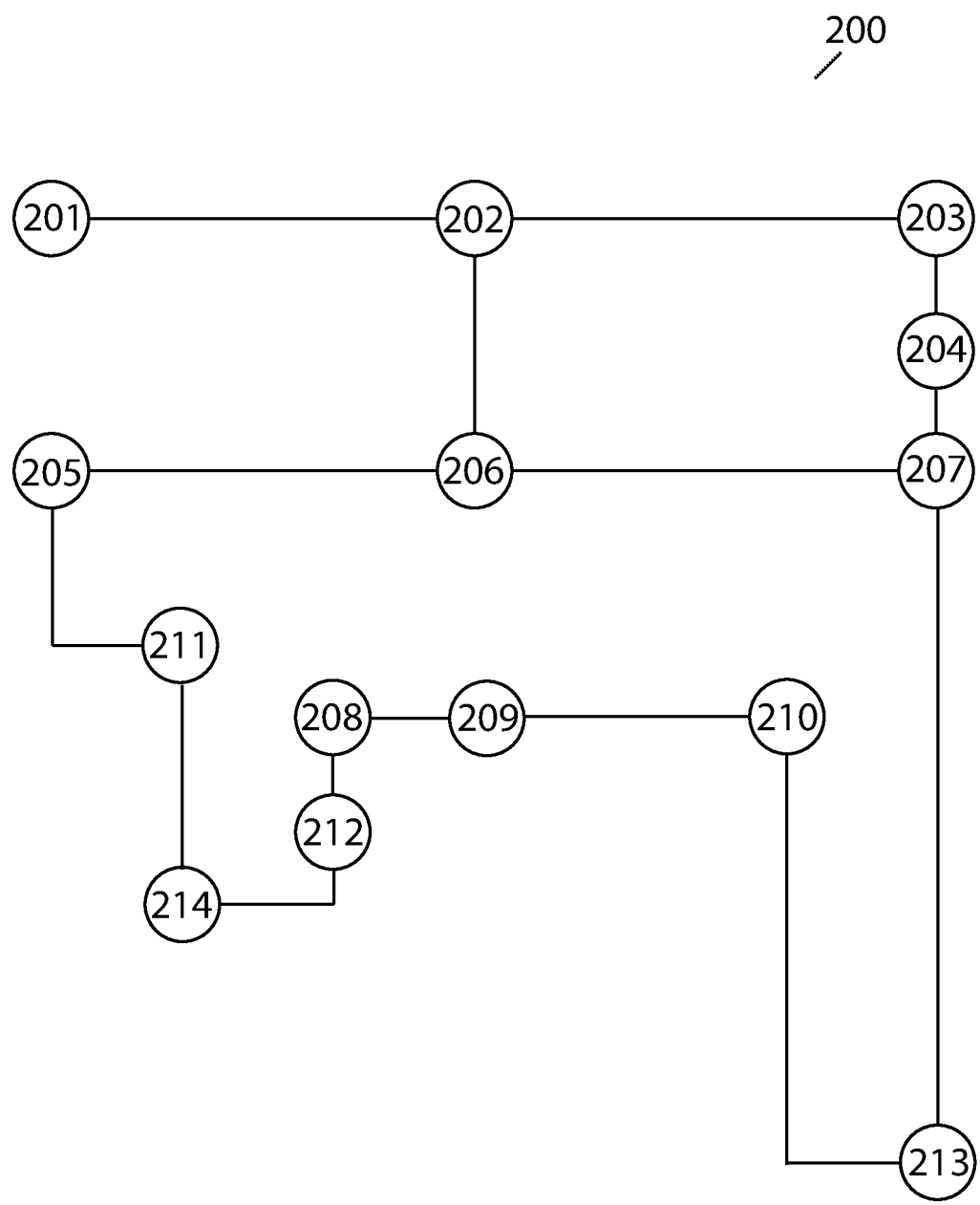
FIG. 2 illustrates another network comprised of a plurality of nodes connected by links embodying features of the present invention.

Referring to FIG. 2, another network 200 is illustrated. If an item with starting node 201 has a destination node of 209, there is more than one route the item may take to arrive at the destination. The item may take the route: node 202, node 206, node 205, node 211, node 214, node 212, node 208, node 209. This route contains seven nodes before the destination is reached. An alternative route is: node 202, node 206, node 207, node 213, node 210, node 209. This route contains five nodes before the destination is reached. Although the first route contains more nodes than the second route, which can cause a route to take longer, the second route may take longer than the first route because the total distance between nodes is greater. Another alternative route is node 202, node 203, node 204, node 207, node 213, node 210, node 209. This route contains six nodes before the destination is reached. Although this route contains more nodes than the second route, it may be advantageous in the event that there is a lot of traffic at node 206. Because it follows a different path than the other two routes, it may serve as an efficient route under certain circumstances.

The efficiency of the particular route used may be evaluated by looking at each segment of the trip between nodes. A small negative reward is assigned at the end of each segment of a trip based on the amount of delay (if any) incurred during the segment. So, referring to the example in FIG. 2, the routes with more nodes will result in more opportunities for delays and therefore penalties. However the delay within each segment of the trip is also accounted for. The system is configured to maximize rewards at all times, so it attempts to select the route with the smallest likelihood of delay. A large positive reward is assigned at the end of each complete trip to incentivize the system to continue trips in spite of the negative rewards incurred after each segment. The following formula may be used to calculate rewards for trip segments:

$$[W(\text{estimated}) - W(\text{actual})]R = \text{reward}$$

where

W (estimated) is the amount of time to complete the segment with no delays;

W (actual) is the amount of time it actually took to complete the segment; and

R is a predetermined reward rate.

The reward rate is negative, so that greater penalties are assigned as the deviation from the estimated segment time (amount of time to complete the segment with no delays) increases.

As stated previously, the system is configured to attempt to maximize rewards at all times, so that it always attempts to find the route with the shortest trip time. This may be represented by:

$$W(\text{estimated}) - W(\text{actual}) = \text{Deviation}$$

$$\underset{D}{\text{ArgMin}}[W(\text{estimated}) - W(\text{actual})]$$

The greater the deviation from the estimated trip time, the larger the penalty. Deviation from the ideal trip time may occur for a variety of reasons, such as traffic within the network and waiting in queues.

The reward of each state may be represented by:

$$R_{(s)} = R_{(ts)}$$

The reward after the transition from state (s) to (s') may be represented by:

$$R_{(s')} = R_{(ts)} + R_{(ts+1)}$$

The total reward for work in the session can be represented by the following formula:

$$R_{(t0)} + R_{(t1)} + R_{(t2)} + R_{(t3)} + \ldots + R_{(tn)} = \text{Total reward}$$

The system is configured to attempt to maximize this value at all times, which is represented by the formula:

$$E[\Sigma R_t] \rightarrow \text{Max}$$

Where E is the expectation that R (reward) is maximized.

Therefore, the value of state (s) when policy ($\pi$) is executed equals the expected sum of all future rewards provided that initial state ($s_0$) is (s) and policy ($\pi$) is executed as represented by the formula:

$$\underset{(s)}{\pi} V = E\pi_t\left[\sum R_t \mid s_0 = s\right]$$

Each time a trip is completed, the system records the corresponding net rewards earned in a table. After completing a number of trips, the system may use the data to determine which routes produce the highest rewards.

From the above, the value iteration may be concluded:

$$V_{(s)} = [\max_a \Sigma P(s \mid s, a) V_{(s')}] R_{(s)}$$

Where:

$\max_a$ = maximizing action $V_{(s')}$ = value of successor $R_{(s)}$ = reward or cost to get to state s P = state transition function R = reward function The above formula is found after convergence according to Bellman's equation represented by the formula:

$$\max \sum_{t=0}^{\infty} \beta^t \mu(c_t) \text{ subject to}$$

$$a_{t+1} = (1 + r)(a_t - c_t) \cdot c_t \geq 0, \text{ and}$$

$$\underset{t=\infty}{\text{limit}} \, a_t \geq 0, \text{ and}$$

$$V(a) = \max_{0 \leq c \leq a} \{\mu(c) + \beta V((1 + r)(a - c))\}$$

The value of a given state depends on the outcome of the prior state multiplied by the cost (penalty incurred) to get there. The system can then compare values of routes used and determine which routes for items traveling from a particular starting node to a particular destination node have the highest value. As the system completes more and more trips, more and more data is gathered, and values are assigned to each state. That is, a value is assigned to each route for delivering an item from a starting node to a destination node. Once values have been assigned to the routes, the system can calculate a policy to maximize rewards. The system develops a policy, $\pi$, which defines the best route yet discovered. This is represented by the formula:

$$\pi(s) = \underset{s'}{\text{argmax}} \sum P(s' \mid s_1 a) V(s')$$

From value iteration methods one may find policy 1, which is a better policy than policy 0, and then find a policy 2, which is a better than policy 1, and so on. The above formula therefore finds the best eventual policy.

$P_a$ (s, s') = Pr ($s_{t+1} = s' \mid s_t = s$, $a_t = a$) is the probability that action a in a state s at time t will lead to state s' at time t+1 and $R_a$ (s, s') is the immediate reward received after transition to state s' from s.

A desirable outcome is to choose a policy, $\pi$, that will maximize the expected discounted sum of the rewards collected at any given S. The system uses the policy, $\pi$, to route items in the best known manner.

S (state) here refers to each possible trip segment of a route. A finite number of segments are possible, thus there are a finite set of states. A is the action of selecting a route, which takes the system from state S to state S'. $A_s$ is the finite set of possible routes defined from any state. T is the time interval between each state transition of S to S'.

The proposed routing method may be used in any application without limitation. For example, the routing method may be used to route packages through a pneumatic tube network, route trains through a rail network, or route baggage through a conveyor belt network.

I claim:

1. A method for determining a route from a beginning node to a destination node in a distribution network, the method comprising:

providing a plurality of nodes connected by a plurality of links that provide a plurality of routes from the beginning node to the destination node, wherein
  each of the plurality of nodes represents a transfer point between links, and wherein
  each link represents a segment of the plurality of routes;
providing an item for traversing the distribution network;
selecting one of the plurality of routes;
traversing the selected route by the item;
evaluating an efficiency of each segment of the selected route as traversed by the item;
calculating a reward based on the item traversing the selected route, wherein calculating the reward based on the item traversing the selected route comprises:
  assigning a negative reward for each segment of the selected route based on any delay on the segment; and
  assigning a positive reward for each segment of the selected route based on completion of the segment; and
  summing the positive and negative rewards for all segments of the selected route;
tabulating the reward;
iteratively traversing the distribution network by other items along others of the plurality of routes and tabulating the rewards; and
selecting a preferred route corresponding with a highest reward based on tabulated rewards for future items to traverse the distribution network.

2. The method of claim 1, wherein the distribution network is selected from the group consisting of: a pneumatic tube network, a rail network, and a conveyor belt network.

3. The method of claim 1, wherein the assigning a negative reward is calculated by the formula:

$$[W(\text{estimated}) - W(\text{actual})]R = \text{reward, where}$$

W (estimated) is a first amount of time to complete the segment with no delays;
W(actual) is a second amount of time to actually complete the segment; and
R is a predetermined reward rate.

4. The method of claim 1, further comprising:
assigning a value to the selected route;
calculating a policy corresponding with values of all selected routes; and
selecting the policy to maximize the reward.

5. The method of claim 4, wherein the policy defines a best route discovered represented by the formula:

$$\pi(s) = \text{argmax}_s \Sigma_{s'} P(s'|s_1 a) \vee (s')$$

where
$\pi$ is the policy;
P is a state transition function;
s (state) is a possible trip segment of a route; and
a is the action of selecting a route.

* * * * *